United States Patent
Mott et al.

(10) Patent No.: US 6,326,970 B1
(45) Date of Patent: Dec. 4, 2001

(54) TV CENTRIC LAYOUT

(75) Inventors: David Mott, Mountain View; James Helman, San Carlos, both of CA (US)

(73) Assignee: Liberate Technologies, San Carlos, CA (US)

( * ) Notice: Subject to any disclaimer, the term of this patent is extended or adjusted under 35 U.S.C. 154(b) by 25 days.

(21) Appl. No.: 09/165,865

(22) Filed: Oct. 2, 1998

Related U.S. Application Data (63) Continuation of application No. 08/951,961, filed on Oct. 16, 1997.
(60) Provisional application No. 60/046,730, filed on May 16, 1997, and provisional application No. 60/046,749, filed on May 16, 1997.

(51) Int. Cl.[7] ................................. G06F 7/00; G06F 3/00
(52) U.S. Cl. ......................... 345/439; 345/130; 345/342; 345/327; 345/326; 707/517
(58) Field of Search ..................................... 345/443, 439, 345/123, 130, 341, 342, 343, 974, 327, 328, 357, 326; 707/504, 503, 908, 513, 514, 515, 517

(56) References Cited

U.S. PATENT DOCUMENTS

| | | |
|---|---|---|
| 4,697,209 | 9/1987 | Kiewit et al. . |
| 5,001,697 * | 3/1991 | Torres ................................. 345/127 |
| 5,065,231 | 11/1991 | Greaves et al. . |
| 5,097,257 | 3/1992 | Clough et al. . |
| 5,155,847 | 10/1992 | Kirouac et al. . |
| 5,202,828 | 4/1993 | Vertelney . |
| 5,204,947 | 4/1993 | Bernstein et al. . |

(List continued on next page.)

FOREIGN PATENT DOCUMENTS

WO 98/28698    7/1998  (WO) .

OTHER PUBLICATIONS

Laura Lemay, "Microsoft FrontPage 97" 2nd Edition, Sams.net Publishing, pp. 267–281, Jan. 1997.*

*Primary Examiner*—Raymond J. Bayerl
*Assistant Examiner*—Thomas Joseph
(74) *Attorney, Agent, or Firm*—Swernofsky Law Group (57) ABSTRACT

Displaying a hypermedia document such as an HTML web page on a television display without using horizontal scroll bars, while preserving the look and feel of the web page as originally contemplated by the web page designer. When possible, each web page is reduced to fit within a specified threshold such as the horizontal margins of the display. Any vertical portion of the web page overlapping the vertical margin is accessed through a vertical scroll bar or similar technique. In a first pass, web page reduction includes rendering the web page without any scaling or changes to the web page and recording web page content statistics to obtain a global indicator as to the horizontal size of the entire web page. Content statistics recorded in each cell includes the following cell content characteristics: the width of the largest non-breaking line of elements; the width of the largest element within a non-breaking line; and the width of the largest embeds or non-breaking horizontal sequence of embeds within a cell. If the total width of the cells is within the specified threshold, no further reduction routine is necessary; otherwise each cell width is reduced using a cell characteristic to help define the new width of each cell. After reduction, the total width of the reduced cells is again checked if it is within the specified threshold. If so, the horizontal size of the web page is within the specified threshold is thus, rendered for a second time using the chosen cell characteristic to help define the width of each cell. Otherwise, successive iterations of cell reduction using a different cell characteristic is performed until the total width of each reduced cell is less than the specified threshold or until the entire set of cell characteristics available is exhausted.

27 Claims, 3 Drawing Sheets

U.S. PATENT DOCUMENTS

| | | |
|---|---|---|
| 5,206,951 | 4/1993 | Khoyi et al. . |
| 5,307,173 | 4/1994 | Yuen et al. . |
| 5,321,806 | 6/1994 | Meinerth et al. . |
| 5,347,632 | 9/1994 | Filepp et al. . |
| 5,365,360 * | 11/1994 | Torres ................................. 345/342 |
| 5,390,295 * | 2/1995 | Bates et al. ........................ 345/336 |
| 5,444,861 | 8/1995 | Adamec et al. . |
| 5,495,610 | 2/1996 | Shing et al. . |
| 5,546,525 * | 8/1996 | Wolf et al. .......................... 345/346 |
| 5,548,702 * | 8/1996 | Li et al. ............................... 345/346 |
| 5,581,686 | 12/1996 | Koppolu et al. . |
| 5,584,025 | 12/1996 | Keithley et al. . |
| 5,624,316 | 4/1997 | Roskowski et al. . |
| 5,638,523 * | 6/1997 | Mullet et al. ....................... 345/326 |
| 5,657,378 | 8/1997 | Haddock et al. . |
| 5,701,451 | 12/1997 | Rogers et al. . |
| 5,717,939 * | 2/1998 | Bricklin et al. .................... 345/128 |
| 5,734,853 | 3/1998 | Hendricks et al. . |
| 5,740,549 | 4/1998 | Reilly et al. . |
| 5,752,042 | 5/1998 | Cole et al. . |
| 5,764,992 | 6/1998 | Kullick et al. . |
| 5,784,058 * | 7/1998 | LaStrange et al. ................. 345/340 |
| 5,809,287 | 9/1998 | Stupeck, Jr. et al. . |
| 5,815,679 | 9/1998 | Liu . |
| 5,818,441 | 10/1998 | Throckmorton et al. . |
| 5,832,223 | 11/1998 | Hara et al. . |
| 5,835,919 * | 11/1998 | Stern et al. ........................ 707/515 |
| 5,838,775 | 11/1998 | Montalbano . |
| 5,841,896 | 11/1998 | Tsuchiya . |
| 5,841,978 | 11/1998 | Rhoads . |
| 5,852,673 | 12/1998 | Young . |
| 5,859,969 | 1/1999 | Oki et al. . |
| 5,862,325 | 1/1999 | Reed et al. . |
| 5,867,166 | 2/1999 | Myhrvold et al. . |
| 5,874,967 | 2/1999 | West et al. . |
| 5,877,741 | 3/1999 | Chee et al. . |
| 5,907,315 | 5/1999 | Vlahos et al. . |
| 5,926,624 | 7/1999 | Katz et al. . |
| 5,936,606 | 8/1999 | Lie . |
| 5,977,960 | 11/1999 | Nally et al. . |
| 5,991,799 | 11/1999 | Yen et al. . |
| 6,005,574 | 12/1999 | Herrod . |
| 6,018,768 | 1/2000 | Ullman et al. . |
| 6,028,583 | 2/2000 | Hamburg . |
| 6,044,403 | 3/2000 | Gerszberg et al. . |
| 6,049,628 | 4/2000 | Chen et al. . |
| 6,049,835 | 4/2000 | Gagnon . |
| 6,104,727 | 8/2000 | Moura et al. . |

* cited by examiner

TV CENTRIC LAYOUT

This application is a continuation of patent application Ser. No. 08/951,961, entitled "TV Centric Layout," filed on Oct. 16, 1997 with attorney docket number NAV-005C, and of the following applications co-pending with application Ser. No. 08/951,961; provisional application Ser. No. 60/046,730, entitled "Improved TV Quality," filed on May 16, 1997 with attorney docket number NAV-005P; provisional application Ser. No. 60/046,749, entitled "Operating System and Memory Management," filed on May 16, 1997, ABN with attorney docket number NAV-006P. The complete disclosures of each of these documents is hereby incorporated herein by reference as if set forth fully herein.

BACKGROUND OF THE INVENTION

1. Field of the Invention

This invention relates to a method of displaying a document containing digitally formatted text, graphics, sounds, and movies ("web page") on a television screen without using horizontal scroll bars, while preserving the look and feel of the web page as originally contemplated by the web page designer.

2. Description of Related Art

Before the convergence of digitally formatted text and/or graphics information content such as web pages with consumer devices such as televisions, web pages were intended to be displayed on computer monitors. This allowed the web page designer some flexibility in determining the content of the web page since most computer monitors were capable of providing non-interlaced display resolutions that exceeded 640 by 480. Refresh rates exceed 60 hertz and are commonly supported as high as 85 hertz.

However, transmission sources in the television domain use an interlaced display format and are optimized to display full motion video. Each frame of the video is scanned out as two fields that are separated temporally and offset spatially in the vertical direction. Under the NTSC video display standard, video signals have an interlaced refresh rate of about 60 hertz and provide 525 horizontal lines by about 320 vertical lines of resolution for each field. This enables a television screen to display television signals carrying full motion video with sufficient clarity and without noticeable flicker. Other television standards such as SECAM and PAL are also used to display video, text, and/or graphics, but are not discussed here to avoid over-complicating the discussion of the problems with the related art.

Text and/or graphics may also be displayed either without a background or as overlays over the full motion video on the background. However, displaying text and/or graphics on a television display screen results in poor image quality because the color television screen's display resolution and color optimization are ill-suited for displaying text and/or graphics. In addition, web page text may be presented using small font sizes which results in poor readability of the text on the television display screen. Such small font sizes includes font sizes less than 12 points or 10 characters per inch.

Another not-so-subtle problem includes scaling the text and graphics to fit within the display resolution of the television screen. Display of web pages having web page content can be crudely forced to "fit" within a window since many computer systems today use a GUI ("Graphical User Interface") that allows windows of varying size to be displayed. Text and/or graphics intended for computer monitor display are generally bit-mapped objects which have a defined resolution. The resolution of an object defines for the object a relative size and a relative clarity. Thus, with respect to clarity there is an incentive to use an object having a higher resolution than that of an object having a lower resolution.

However, since the resolution of the object also defines the relative size of the object, an object having a resolution that is greater than the resolution of a display results in an oversized object. This is sometimes referred to as the oversize problem. This problem was not often encountered in the computer domain since most monitors had display resolutions that either equalled or exceed the resolutions of objects commonly displayed on such monitors such as web pages displaying bit-mapped text and images.

Consequently, designers of web pages, or any other type of presentation format that displayed bit-mapped text and images, had some leeway in choosing objects that were of higher resolution.

However, the display of bit-mapped text and/or graphics is not well-suited with consumer devices such as televisions. For example, displaying a web page having text and/or images does not render well on a television display screen because the television display screen does not provide the same level of resolution as a computer monitor and is color optimized to display full motion color video. Thus, not only does a television display screen offer poor image quality but it is prone to an oversize problem because it offers lower resolution than the resolution of images and text found in web pages. The oversize problem usually results in only a portion of the web page being displayed.

One known solution to the oversize problem is to reduce images having sizes that are causing the problem, while maintaining the original size of other images within a web page so that the web page fits within the horizontal margins of the television display screen. However, such an approach changes the overall proportion of the web page and thus, does not preserve the original look and feel of the web page. Moreover, by not scaling all of the images in the web page may result in foreground images mis-aligning with other adjacent foreground images or with a background image.

Another known solution under the NTSC standard is to provide an overscan resolution, which resolution provides 640 by 480 lines of resolution but results in some of the video being lost beyond the edges of the screen. To access the entire display horizontal and vertical scroll bars may be employed to permit a viewer to scroll the screen to access portions of the display not shown. However, this approach does not retain the original look and feel of the web page since it results in only a portion of the web page being shown on the screen at a given time.

Accordingly, it would be desirable to provide a method of displaying a web page within a television display screen that attempts to retain the original look and feel of the web page while allowing the web page to fit within a selected horizontal width without the use of horizontal scroll bars.

SUMMARY OF THE INVENTION

The present invention provides a method of displaying a hypermedia document such as a HTML formatted web page on a television display screen without using horizontal scroll bars, while preserving the look and feel of the web page as originally contemplated by the web page designer. Whenever possible, each HTML web page is reduced in size to fit within a specified threshold such as the horizontal margins of the screen. Any vertical portion of the web page overlapping the vertical margin is accessed through a vertical scroll bar or similar technique. A vertical scroll bar enables a viewer to scroll the screen to access vertical portions of the web page that does not fit within the television display screen.

Web page reduction is accomplished by first rendering the web page without any scaling or changes to the web page. Web page content statistics are recorded to obtain a global indicator as to the horizontal size of the entire web page during the first pass. In a preferred embodiment, the content statistics recorded in each cell during the first pass includes at least the following cell content characteristics ("cell characteristics"): the width of the largest non-breaking line of elements; the width of the largest element within a non-breaking line; and the width of the largest embeds or non-breaking horizontal sequence of embeds within a cell. An embed is defined as an element that includes image data such as a pixel file which may be an image in GIF or JPEG format.

If the total width of the cells is within the specified threshold, no further reduction routine is necessary; otherwise each cell width is reduced using a cell characteristic to help define the new width of each cell. After reduction, the total width of the reduced cells is again checked if it is within the specified threshold. If so, the horizontal size of the web page is within the specified threshold and of the proper size and is thus, rendered for a second time using the chosen cell characteristic to help define the width of each cell. Otherwise, successive iterations of cell reduction using a different cell characteristic is performed until the total width of each reduced cell is less than the specified threshold or until the entire set of cell characteristics available is exhausted. In a preferred embodiment each cell width characteristic provided in each successive iteration of cell reduction has a width that is typically smaller than the previous cell width characteristic used, resulting in an incremental reduction of the total width of the cells.

DESCRIPTION OF THE PREFERRED EMBODIMENTS

The invention can be used in conjunction with other inventions relating to text and graphic element displays, such as inventions described in the following patent applications: U.S. patent application Ser. No. 08/770,238, entitled, "INTERNET MULTIPLEXER FOR BROADCAST AND OTHER INFORMATION," having attorney docket number "NAV-001;" U.S. provisional patent application Ser. No. 60/045,476, entitled, "NAVIO TV NAVIGATOR," having attorney docket number "NAV-003P;" and U.S. provisional patent application Ser. No. 60/046,730, entitled, "IMPROVED TV QUALITY," having attorney docket number "NAV-005P."

These applications are hereby incorporated by reference as if fully set forth herein.

In the following description, a preferred embodiment of the invention is described with regard to preferred process steps and data structures. Those skilled in the art would recognize after perusal of this application that embodiments of the invention can be implemented using one or more general purpose processors operating under program control, or special purpose processors adapted to particular process steps and data structures, and that implementation of the process steps and data structures described herein would not require undue experimentation or further invention.

FIG. 1 is a schematic block diagram illustrating a typical web page.

As known in the art, a HTML web page or frame within a web page is often formatted with tables having at least one cell. A frame is a region that may be defined within a web page. More than one frame may be defined in a single web page. Each frame acts as a nested web page within the web page since each frame may contain information from different URLs ("Universal Resource Locators").

A table creates a set of rows and columns which can be used to align and/or divide text and images. Each intersection between a row and column defines a cell. Each cell has a cell width that is determined by its cell contents and cell content characteristics ("cell characteristics"). The cell contents may include text, images, nested tables or a combination of these. Cell characteristics may include the width of the largest non-breaking line of elements; the largest element within a non-breaking line; and the largest embeds, e.g., images, or non-breaking horizontal sequence of embeds within a cell. The width of these characteristics may be defined either in pixels or as a percentage of a specified horizontal threshold such as the maximum horizontal width of a display screen.

An embed is defined as any inline non-textual object, while an element is defined as any text-based object such as words or character-based symbols. An inline object is defined as a graphic that is displayed inside a web page as compared to a graphic that is not displayed as part of the web page but is downloaded separately from a second web page. A graphic is defined as an element that includes bit-mapped image data such as a pixel file which may be formatted in a GIF or JPEG format.

A web page or frame may be regarded as a cell whose width is determined by its contents, including other frames or tables contained within it and the width of a background image.

Figure 1A:
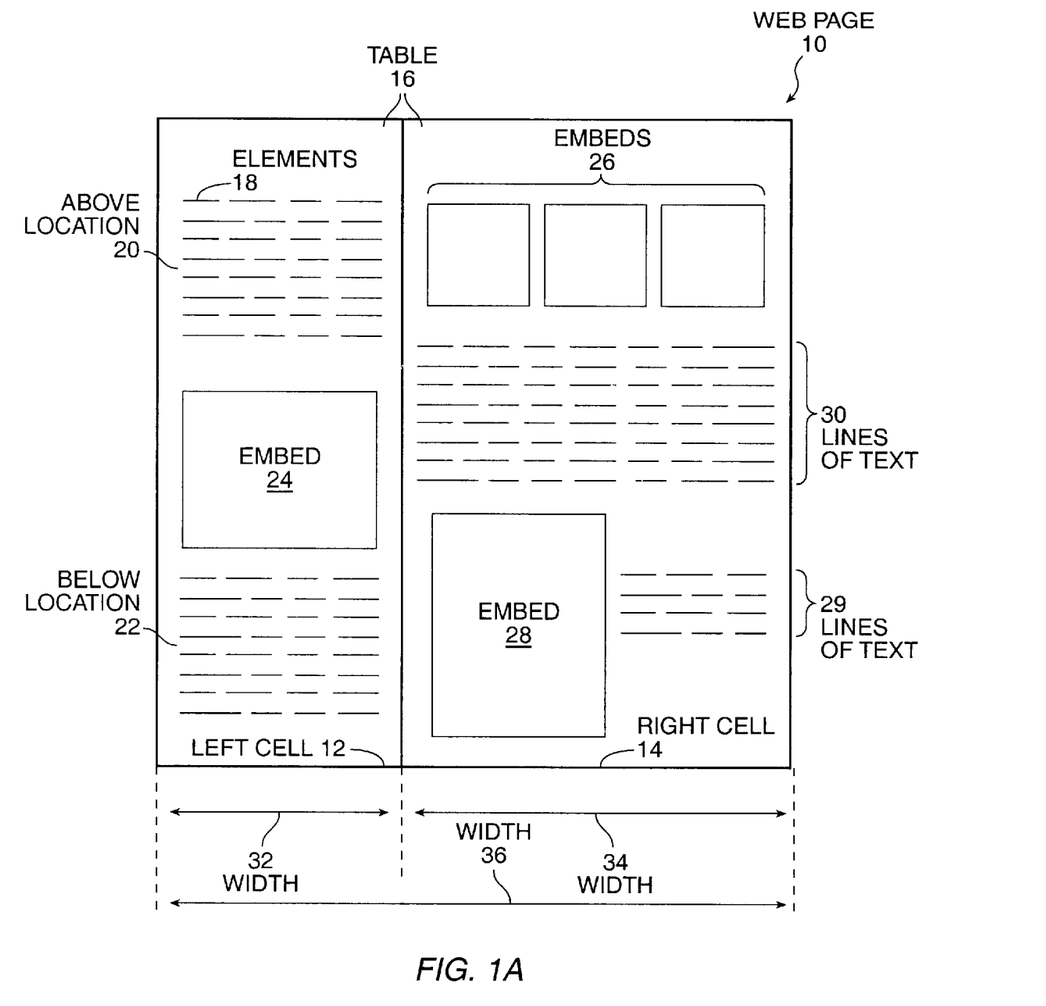
FIG. 1A is a block diagram illustrating a layout of a web page.

FIG. 1A is a block diagram illustrating a layout of an example web page 10 having a left cell 12 and a right cell 14 which together form a table 16. In left cell 12 elements 18 such as text are placed in a location above 20 and below 22 an embed 24. Right cell 14 contains a horizontal sequence of embeds 26, a single embed 28, lines of text 30 placed between embeds 26 and 28, and lines of text 29 placed to the right side of embed 28. Left cell 12 has a defined cell width 32 and right cell 14 has a defined cell width 34. Defined cell widths 32 and 34 combine to form a total width 36 for each cell. If left and right cells 12 and 14 are the only cells in table 16 and table 16 comprises web page 10 entirely, the total width 36 would approximately define the width for web page 10.

Figure 1B:
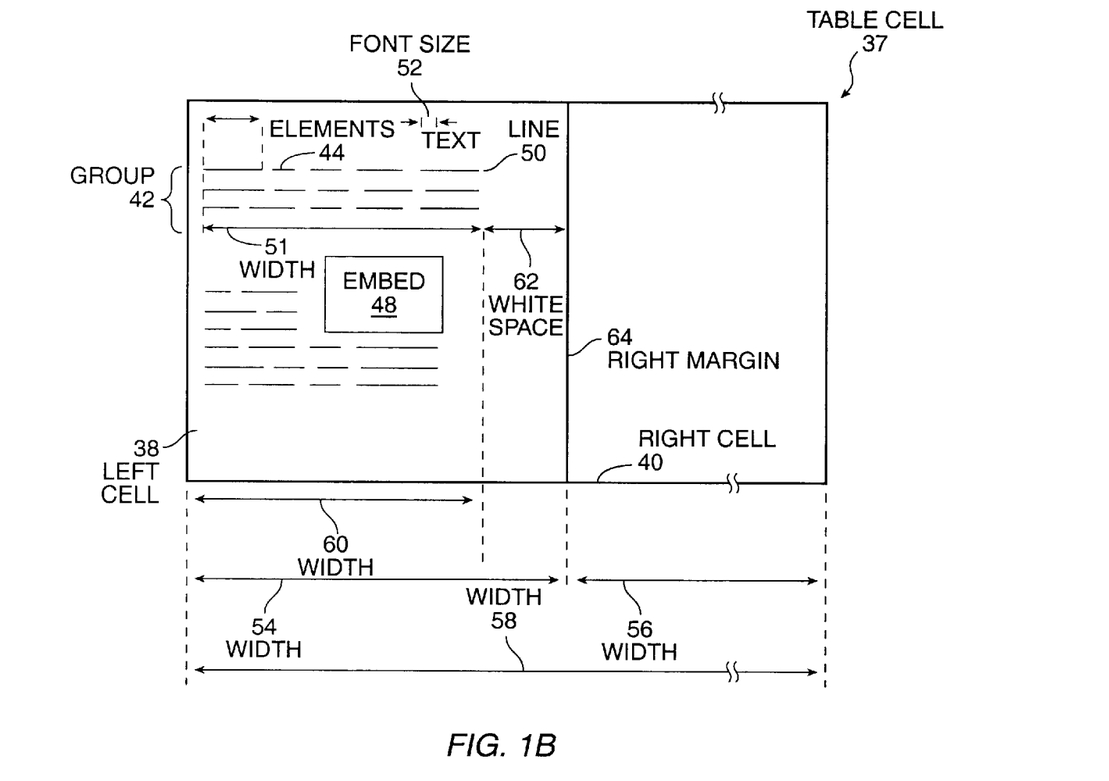
FIG. 1B is a block diagram illustrating an example table cell having a cell width before and after a cell width reduction step.

FIG. 1B is a block diagram illustrating an example table cell 37 having a cell width before and after a cell width reduction step. Two cells are shown, left cell 38 and right cell 40, Left cell 38 has a group 42 of lines having elements 44 above an embed 28. Line 50 is defined as a non-breaking line of elements and has a width 51 that exceeds all other lines in group 42. Each element has sub-elements with each sub-element having a font size 52. Left cell 38 and right cell 40 have cell widths 54 and 56, respectively, which combine to form a total width 58 for each cell. After a cell reduction, cell width 54 may be reduced to a width 60 equal to width 51 of group 42. By reducing cell width 54 to width 51 "white space" 62 between one end of line 50 and the right margin 64 of left cell 38 is reduced. Cell width 56 may also be reduced but is not discussed here to avoid over-complicating the discussion.

Method of Operation

Figure 2:
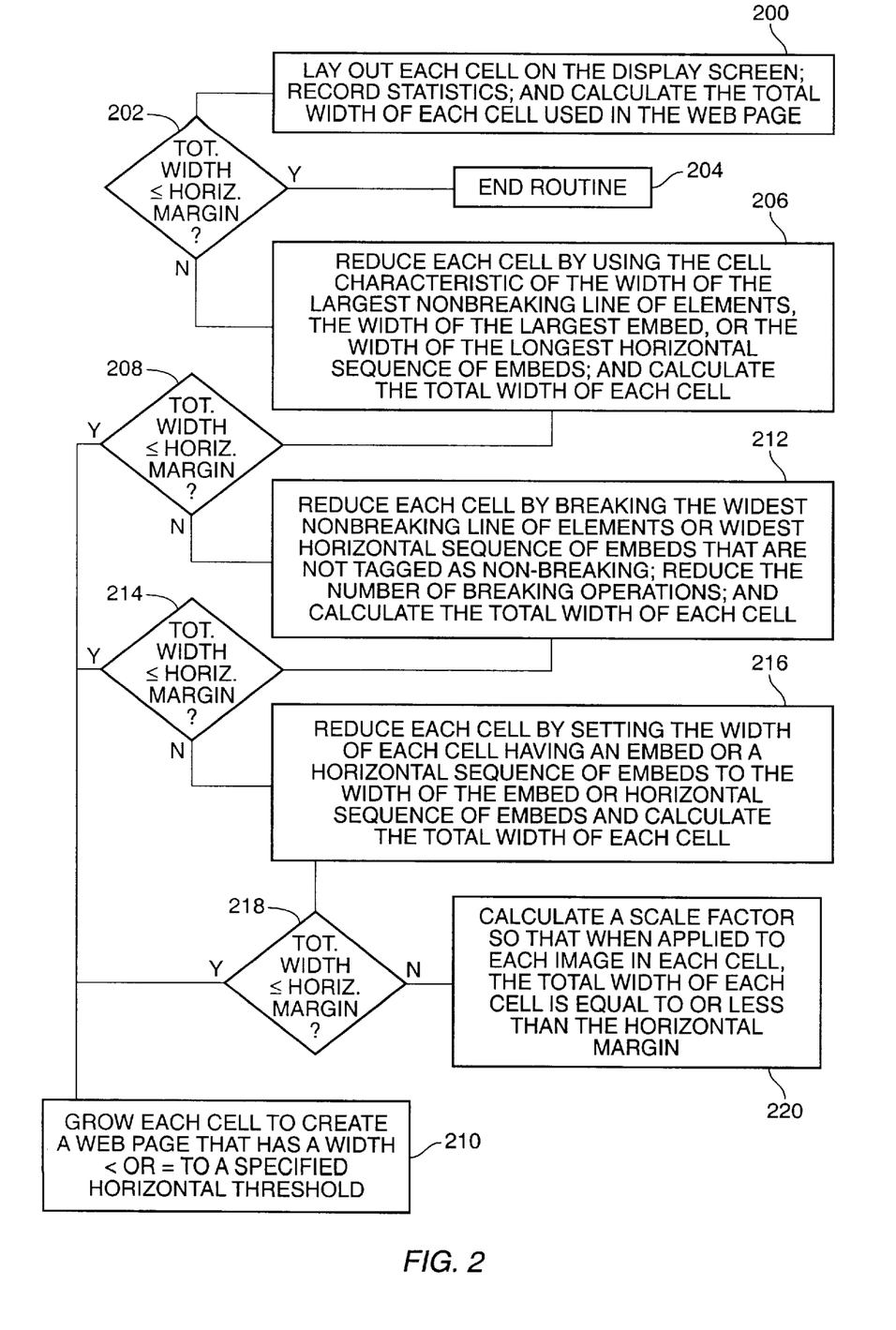
FIG. 2 is a process flow diagram showing the operation of a preferred embodiment of the present invention.

FIG. 2 shows a flow chart of the method of operation in a presently preferred embodiment of the present invention.

At step 200 each cell of the web page is rendered onto a display screen without any scaling or changes to the contents of each cell. This step includes a step of recording content statistics to obtain a global indicator as to the entire horizontal size of the web page during the first pass. The unit of measurement for all statistics collected is in pixels. The statistics recorded for each cell includes the width of the largest non-breaking line of elements, the width of the largest element, and the width of the largest embed and the width of the longest non-breaking horizontal sequence of embeds.

Step 200 also includes a step of calculating the total width of each individual cell rendered during the first layout The width of a cell is defined as the width of its widest line or its stated width whichever is larger. A line may comprise the sum widths of every element and/or embed that are horizontally adjacent within a cell.

At step 202 the total width of the cells is checked to see if it is within a specified horizontal threshold. If so, the layout routine is ended at step 204, otherwise step 206 is performed.

At step 206, a cell width reduction step is performed on each cell using a cell characteristic to help establish a reduced width for each cell. In the preferred embodiment the chosen cell characteristic used in this step is the width of the largest non-breaking line of elements, the width of the largest embed or the width of the largest horizontal sequence of embeds in each cell. Each cell width in the web page is adjusted to match this width.

At step 208, the total width of the reduced cells is checked if it is within the specified horizontal threshold. If so, step 210 is performed by growing each cell and by rendering the web page on the display screen using the chosen cell characteristic in step 206 to help define the width of each cell.

Growing each cell further optimizes the viewing quality of the web page by distributing to each cell any excess space between the total width of each cell and the specified horizontal threshold until the total width of each cell and the specified horizontal threshold are equal. Excess space is distributed by incrementing the size of each cell equally but not allowing a cell to become wider than its widest laid-out width, as originally specified. In this way, no cell needlessly takes up extra space and the excess space is distributed where it is truly needed. Additionally, if a table is within a cell of another table, and a second pass occurs in the outer table, the inner table size is adjusted and re-rendered if the outer table's cell size has been reduced, enlarged and the inner table could use more space, or the scale factor has changed. Also, the re-rendering of the outer table may result in the cell containing an inner table having a size change. If the cell is smaller, then the inner table must be readjusted and re-rendered. If the cell is bigger, then the size of the inner table is adjusted and the inner table re-rendered only if a scale factor has been applied to the embeds within it or if the inner table can use more space.

If at step 208 the total width of the reduced cells is outside the specified horizontal threshold, then step 212 is performed.

At step 212, a cell width reduction step is performed on each cell using the width of either 1) the largest element in a non-breaking line of elements or 2) the largest embed in a horizontal sequence of embeds in a non-breaking line as a cell characteristic to help define a reduced width of each cell. Thus, a cell is reduced in step 212 by breaking up a non-breaking line of elements but is never made smaller than the largest embed or horizontal sequence of non-breaking embeds.

Specifically, at step 212 global attempts are made not to line break a line in unintended places by taking cell width from one cell and giving it to the cell having the unintended line break. If the non-breaking line of elements has been designated non-breaking then the cell reduction step removes the non-breaking restriction so that a line of elements may wrap when it reaches the margin of the cell. This promotes the line of elements to break at a space. Any horizontal sequence of embeds tagged as non-breaking are not line broken.

However, if the total width of the cells still exceeds the width of the defined horizontal threshold, an attempt is made to line break the widest line of elements or a horizontal sequence of embeds that are not non-break restricted in larger cells, while attempting to retain the original widths of the smaller cells. Attempting line breaks in the larger cells results in the reduction of the number of cells in which to effect the line breaking of elements or embeds. Elements with hyphens will be line broken at the hyphen if this keeps the text within the margins of the cell.

Any horizontal sequence of embeds that are tagged as non-breaking are ignored in step 212 and are thus not line broken to reduce cell width. Instead, the non-breaking horizontal sequence of embeds are reduced in the manner described in cell reduction steps 216 or 220.

At step 214, the total width of the reduced cells is checked to see if it is within the specified horizontal threshold. If so, step 210 is performed by growing each cell and by rendering the web page using the chosen cell characteristic to help define the width of each cell.

If at step 214 the total width of the reduced cells is outside the specified horizontal threshold, then step 216 is performed.

At step 216 a cell width reduction step is performed on each cell by adjusting each width of the cell to match the width of the widest embed or widest horizontal sequence of embeds in each cell. Thus, a cell is not reduced by less than the width of the smallest embed in the cell.

At step 218, the total width of the reduced cells is checked to see if it is within the specified horizontal threshold. If so, step 210 is performed by growing each cell and by rendering the web page using the chosen cell characteristic to help define the width of each cell.

Otherwise, at step 220, a scale factor is computed which will reduce all the images so that the total width of the cells fit within the specified horizontal threshold. In a preferred embodiment the scale factor is chosen by calculating the difference between the total width of each cell and the specified horizontal threshold. The maximum width of the embedded non-textual elements in each column are summed to produce the total embed width. The scale factor is then computed by subtracting the difference from the total embed width with the outcome divided by the total embed width.

The scale factor is applied to each image within the web page or within the frame, i.e., it is applied globally, rather than applying different scale factors to fit each image within a cell. Global application of the scale factor maintains the proper alignment of adjacent images with shared visual features since it obtains both horizontal and vertical consistency between embeds. The scale factor is also used to scale down the background image so that it aligns properly with elements in the page. Text size is not reduced to avoid rendering unreadable text on the display.

In a web page or frame, the width of an embed or horizontal sequence of embeds that results in the scaling down of a page may be vertically separated from other embeds by text or space. In this case, the web page may be broken up into independent sections. The mechanism already described is then used to determine different scale factors for each section. This improves upon the global scale factor approach by not forcing every element in a web page to be scaled down when only a single section containing large elements requires it. This allows adjacent images to be scaled uniformly therefore keeping the adjacent images aligned.

Also, cell widths as stated in a web page are taken as a hint and may not be honored. Alternatively, percent cell widths may also be taken as a hint and may not be honored. More specifically, a stated cell size provides a starting point for a first pass layout. If the stated size is too small for the contents of a cell, it will be ignored and the cell will be grown to fit the cell contents as the total web page permits. If a stated size is larger than the contents of a cell, then it will be honored (used) in the first pass layout.

Alternative Embodiments

While preferred embodiments are disclosed herein, many variations are possible which remain within the concept and scope of the invention, and these variations would become clear to one of ordinary skill in the art after perusal of the specification, drawings and claims herein.

What is claimed is:

1. A method of processing a layout for a page, the method comprising:
   receiving a first layout for the page arranged for display at a first resolution; and
   generating a second layout for the page from the first layout, the second layout arranged for display at a second resolution different from the first resolution, by: (a) comparing a set of statistics for said first layout with a set of selected thresholds, (b) horizontally shrinking cells using a selected cell characteristic in response to said comparing to define a shrinkage amount, and (c) growing each cell until a total width equals or exceeds a selected horizontal threshold.

2. The method in claim 1, wherein said step of generating a first layout includes a step of recording cell statistics, said cell statistics including the width of the longest non-breaking line of elements, the width of the largest element, and the width of the largest embed and the width of the longest non-breaking horizontal sequence of embeds.

3. The method in claim 2, wherein said step of generating a first layout includes a step of calculating the total width of each cell used in said page in response to said statistics.

4. The method in claim 1, wherein said step of generating a second layout includes a step of reducing said cells to said width of the longest non-breaking line of elements and calculating the total width of said cells when said total width exceeds said selected horizontal threshold, otherwise growing said cells to create a page that has a total width less than or equal to said selected horizontal threshold.

5. The method in claim 1, wherein said step of generating a second layout includes a step of reducing each cell to the width of said longest non-breaking line of elements of said cell and calculating the total width of each cell in said page.

6. The method in claim 1, wherein said step of generating a second layout includes a step of setting the width of each cell having an embed to the width of said embed, and calculating the total width of each cell used in said page.

7. The method in claim 1, wherein said step of generating a second layout includes a step of calculating a scale factor when said total width exceeds said selected horizontal threshold, otherwise growing each cell to create a web page that has a width less than or equal to said selected horizontal threshold, said scale factor calculated so that when applied to each embed in each cell, the total width of each cell is equal to or less than said selected horizontal threshold.

8. The method in claim 1, wherein said step of generating a second layout includes a step of laying out said page having embeds scaled by said scale factor.

9. The method in claim 8, wherein said step of generating a second layout includes a step of applying said scale factor to at least one background embed in said page.

10. The method in claim 1, further including a step of separating said page into sections, said sections defined by an area having at least one embed vertically separated from another embed in said page by text or space.

11. The method in claim 10, wherein said step of generating a second layout includes a step of calculating a scale factor when said total width exceeds said selected horizontal threshold, otherwise growing each cell to create a page that has a total width that is less than or equal to said selected horizontal threshold, said scale factor calculated so that when applied to each embed in at least one selected section, the total width of said page is equal to or less than said selected horizontal threshold.

12. The method as in claim 1, wherein the horizontal threshold is a width of a displayed portion of a television display screen, whereby the layout is scaled so as to fit on the displayed portion.

13. The method as in claim 1, wherein the set of statistics includes a total width of each cell in the first layout, a width of a widest non-breaking line of items in each cell, a sum of widths of each longest non-breaking line of items of each cell, a width of a widest item in each cell, and a sum of widths of each widest item of each cell.

14. The method as in claim 13, wherein the set of statistics further includes a width of a widest embed element that is to be scaled.

15. The method as in claim 1, wherein cells are shrunk and grown horizontally but not vertically.

16. The method as in claim 1, wherein when a cell is shrunk or grown, images are shrunk or grown, but text is not shrunk or grown.

17. A method of displaying a web page on a television display screen having a horizontal margin, the web page having at least one cell containing web page content, the method comprising the steps of;
   receiving the web page arranged for display at a resolution different from a resolution of the television display;
   processing the web page for display at the resolution of the television display by: (a) laying out each cell; (b) recording statistics on the web page content, said statistics including the total width of each cell, the widest non-breaking line of items in each cell, the sum of each said longest non-breaking line of items of each cell, the widest item in each cell, and the sum of each said widest item of each cell; (c) calculating the total width of each cell used in the web page in response to said statistics; (d) reducing each cell width to said longest non-breaking line of elements of each cell and calculating the total width of each cell used in the web page, if said total width exceeds the horizontal margin, otherwise growing each cell to create a web page that has a width less than or equal to the horizontal margin; (e) converting said widest non-breaking line of items in each cell to a breakable line of items and calculating the total width of each cell used in the web page, if said total width exceeds the horizontal margin, otherwise growing each cell to create a web page that has a width less than or equal to the horizontal margin; (f) setting the width of each cell having an embed to the width of said embed and calculating the total width of each cell used in the web page, if said total width exceeds the horizontal margin, otherwise growing each cell to create a web page that has a width less than or equal to the horizontal margin; and (g) calculating a scale factor so that if applied to each embed in each cell the total width of each cell is equal to or less than the horizontal margin, if said total width exceeds the horizontal margin, otherwise growing each cell to create a web page that has a width less than or equal to the horizontal margin; and displaying the processed web page on the television display.

18. The method in claim 17, further including a step of laying out said page having embeds scaled by said scale factor.

19. The method as in claim 17, wherein the statistics recorded on the web page content further include a width of a widest embed element that is to be scaled.

20. The method as in claim 17, wherein cells are reduced and grown horizontally but not vertically.

21. The method as in claim 17, wherein when a cell is shrunk or grown, images are shrunk or grown, but text is not shrunk or grown.

22. The method as in claim 17, further comprising the step of applying the scale factor to the cells.

23. The method as in claim 22, wherein the scale factor is applied to images in the cells, but not to text in the cells.

24. A program recorded in a computer-readable medium for processing a layout of a page, the program comprising the steps of:

receiving a first layout for the page arranged for display at a first resolution; and generating a second layout for the page from the first layout, the second layout arranged for display at a second resolution different from the first resolution, by: (a) comparing a set of statistics for said first layout with a set of selected thresholds, (b) horizontally shrinking cells using a selected cell characteristic in response to said comparing to define a shrinkage amount, and (c) growing each cell until a total width equals or exceeds a selected horizontal threshold.

25. An apparatus having a program recorded in a computer-readable medium for processing a layout of a page, the apparatus comprising:

means for receiving a first layout for the page arranged for display at a first resolution; and means for generating a second layout for the page from the first layout, the second layout arranged for display at a second resolution different from the first resolution, by: (a) comparing a set of statistics for said first layout with a set of selected thresholds, (b) horizontally shrinking cells using a selected cell characteristic in response to said comparing to define a shrinkage amount, and (c) growing each cell until a total width equals or exceeds a selected horizontal threshold.

26. A program recorded in a computer-readable medium for displaying a web page on a television display screen having a horizontal margin, the web page having at least one cell containing web page content, the program comprising the steps of:

receiving the web page arranged for display at a resolution different from a resolution of the television display;

processing the web page for display at the resolution of the television display by: (a) laying out each cell; (b) recording statistics on the web page content, said statistics including the total width of each cell, the widest non-breaking line of items in each cell, the sum of each said longest non-breaking line of items of each cell, the widest item in each cell, and the sum of each said widest item of each cell; (c) calculating the total width of each cell used in the web page in response to said statistics; (d) reducing each cell width to said longest non-breaking line of elements of each cell and calculating the total width of each cell used in the web page, if said total width exceeds the horizontal margin, otherwise growing each cell to create a web page that has a width less than or equal to the horizontal margin; (e) converting said widest non-breaking line of items in each cell to a breakable line of items and calculating the total width of each cell used in the web page, if said total width exceeds the horizontal margin, otherwise growing each cell to create a web page that has a width less than or equal to the horizontal margin; (f) setting the width of each cell having an embed to the width of said embed and calculating the total width of each cell used in the web page, if said total width exceeds the horizontal margin, otherwise growing each cell to create a web page that has a width less than or equal to the horizontal margin; and (g) calculating a scale factor so that if applied to each embed in each cell the total width of each cell is equal to or less than the horizontal margin, if said total width exceeds the horizontal margin, otherwise growing each cell to create a web page that has a width less than or equal to the horizontal margin; and displaying the processed web page on the television display.

27. An apparatus having a program recorded in a computer-readable medium for displaying a web page on a television display screen having a horizontal margin, the web page having at least one cell containing web page content, the apparatus comprising:

means for receiving the web page arranged for display at a resolution different from a resolution of the television display; and means for processing the web page for display at the resolution of the television display by: (a) laying out each cell; (b) recording statistics on the web page content, said statistics including the total width of each cell, the widest non-breaking line of items in each cell, the sum of each said longest non-breaking line of items of each cell, the widest item in each cell, and the sum of each said widest item of each cell; (c) calculating the total width of each cell used in the web page in response to said statistics; (d) reducing each cell width to said longest non-breaking line of elements of each cell and calculating the total width of each cell used in the web page, if said total width exceeds the horizontal margin, otherwise growing each cell to create a web page that has a width less than or equal to the horizontal margin; (e) converting said widest non-breaking line of items in each cell to a breakable line of items and calculating the total width of each cell used in the web page, if said total width exceeds the horizontal margin, otherwise growing each cell to create a web page that has a width less than or equal to the horizontal margin; setting the width of each cell having an embed to the width of said embed and calculating the total width of each cell used in the web page, if said total width exceeds the horizontal margin, otherwise growing each cell to create a web page that has a width less than or equal to the horizontal margin; and (g) calculating a scale factor so that if applied to each embed in each cell the total width of each cell is equal to or less than the horizontal margin, if said total width exceeds the horizontal margin, otherwise growing each cell to create a web page that has a width less than or equal to the horizontal margin; and means for displaying the processed web page on the television display.

\* \* \* \* \*